United States Patent [19]
Lences

[11] Patent Number: 5,648,418
[45] Date of Patent: Jul. 15, 1997

[54] LOW MOLECULAR WEIGHT COPOLYMER AMIDES

[75] Inventor: Charles Francis Lences, Parsippany, N.J.

[73] Assignee: AlliedSignal Inc., Morris Township, N.J.

[21] Appl. No.: 651,451

[22] Filed: May 22, 1996

Related U.S. Application Data

[60] Continuation of Ser. No. 483,492, Jun. 7, 1995, abandoned, which is a division of Ser. No. 280,292, Jul. 26, 1994, abandoned, which is a continuation of Ser. No. 88,485, Jul. 7, 1993, abandoned, which is a continuation of Ser. No. 938,319, Aug. 31, 1992, abandoned, which is a continuation of Ser. No. 452,527, Dec. 18, 1989, abandoned.

[51] Int. Cl.$^6$ .............. C08F 8/32; C08F 20/06; C08K 9/04; C08L 23/36

[52] U.S. Cl. .......... 524/538; 524/514; 524/556; 524/559; 525/69; 525/183; 528/310; 528/323; 106/505

[58] Field of Search ................. 524/514, 538, 524/556, 559; 525/69, 183; 528/310, 323; 106/505

[56] References Cited

U.S. PATENT DOCUMENTS

| | | |
|---|---|---|
| 3,673,277 | 6/1972 | Schmitt . |
| 3,963,799 | 6/1976 | Starkweather . |
| 4,132,690 | 1/1979 | Ernstman . |
| 4,474,473 | 10/1984 | Higuchi .................... 366/75 |
| 5,041,163 | 8/1991 | Booth ...................... 106/504 |
| 5,049,626 | 9/1991 | Akimoto . |

FOREIGN PATENT DOCUMENTS

| | | |
|---|---|---|
| 871187 | 7/1971 | Canada . |
| 35367 | 10/1971 | Japan . |
| 915453 | 5/1960 | United Kingdom . |

*Primary Examiner*—David Buttner
*Attorney, Agent, or Firm*—Colleen D. Szuch; Roger H. Criss

[57] ABSTRACT

A low molecular weight copolymer reaction product of a copolymer acid of an α-olefin and an unsaturated carboxylic acid, preferably an α,β-ethylenically unsaturated carboxylic acid, and at least one amino acid compound. The present invention includes a method of preparing the copolymer reaction product. The reaction product has excellent compatibility with other polymers, particularly polyamides. The copolymer reaction product is useful in a method to flush water from pigments.

15 Claims, No Drawings

LOW MOLECULAR WEIGHT COPOLYMER AMIDES

This application is a continuation of application Ser. No. 08/483,492 Filed Jun. 7, 1995, now abandoned, which is a division of application Ser. No. 08/280,292, filed Jul. 26, 1994 (now abandoned) which is a continuation of application Ser. No. 08/088,485, filed Jul. 7, 1993 (now abandoned) which is a continuation of application Ser. No. 07/938,319, filed Aug. 31, 1992 (now abandoned) which is a continuation of application Ser. No. 07/452,527 filed Dec. 18, 1989 (now abandoned).

BACKGROUND OF THE INVENTION

1. Field of Invention

This invention is in the field of low molecular weight olefin copolymers; more particularly, this invention relates to low molecular weight copolymers of an α-olefin and an unsaturated carboxylic acid, preferably an α,β-ethylenically unsaturated carboxylic acid having up to 100 percent of the carboxylic acid groups reacted with at least one amino acid. The reaction product is useful for flushing pigments.

2. Description of Related Art

The process of flushing pigments is reviewed in Great Britain Patent No. 915,453, and by Apps, *Printing Ink Technology*, Chemical Publishing Co., Inc., NY, pp.498–500 (1959). Flushing is a process to prepare pigment dispersions in which the pigments remain finely divided and in a suitable form for further processing such as incorporation into polymeric compositions and inks.

During the manufacture of pigments an aqueous mass of pigment is produced. The removal of all of the water can result in the pigments agglomerating. Some of the water is removed leaving the finely divided pigment as a wet cake. The aqueous mass of pigment is mixed with a polyolefin usually of low molecular weight. The mixture is coagulated and the aqueous phase is removed, typically by heating the composition, optionally in a vacuum. The pigment is dispersed in the low molecular weight polymer which can optionally be pulverized.

Low molecular weight polyethylene waxes are used to flush pigments. The flushed pigments are useful in polymeric compositions used for fibers, molding compounds, extrusion compounds, sheets, film, and the like. Flushed pigments have been used in compositions based on polyethylene, polyvinylchloride, ABS, polyamides, and polycarbonates, among other.

Low molecular weight olefinic copolymers, particularly low molecular weight ethylene copolymers, are described in U.S. Pat. No. 3,658,741. This patent discloses homogeneous copolymers of ethylene and various comonomers including unsaturated acids and their derivatives, such as esters and amides. Examples of the derivatives include methyl acrylate, methyl methacrylate, ethyl acrylate, and dimethylaminoethyl methacrylate.

U.S. Pat. No. 4,381,378 discloses a method for the preparation of low molecular weight copolymer salts from low molecular weight copolymer acids of α-olefins and α,β-ethylenically unsaturated carboxylic acids. Preferred copolymers are copolymers of ethylene and acrylic acid.

U.S. Pat. Nos. 4,412,040 and 4,603,172 disclose low molecular weight copolymer salts for use as lubricants and dispersion aides in plastics. The disclosed salts include salts of low molecular weight copolymers of α-olefins and α,β-ethylenically unsaturated carboxylic acids. Preferred copolymers are copolymers of ethylene and acrylic acid.

U.S. Pat. Nos. 3,388,186 and 3,465,059 disclose polyamide compositions. The compositions are made by grafting amino acids or lactams onto a backbone chain containing recurring ethylenic units and reactive sites, such as carboxyl radicals of acid, ester or salt groups, and particularly acrylic acid esters. The proportion of the copolymer backbone to the polyamide graft can vary between 2 and 90 percent. The copolymers disclosed for use as part of the backbone chain have a number average molecular weight of at least about 13,700 in U.S. Pat. No. 3,388,196; and at least 10,000 in U.S. Pat. No. 3,465,059.

U.S. Pat. No. 3,634,543 discloses nucleated graft polymers of polycaprolactam on carboxy containing copolymeric backbone. The graft polymer is prepared by polymerization of caprolactam in the presence of a copolymer of an olefin and an unsaturated carboxylic acid.

U.S. Pat. No. 4,035,438 discloses an impact resistant mixture of polyethylene; a graft polymer of an ethylene/acrylic acid copolymer or ethylene/methacrylic acid copolymer as a graft substrate and grafted polymerised units of ε-caprolactam; and polycaprolactam. The copolymers for use as graft substrates are those which contain 1 to 10 mol percent of (meth)acrylic acid, preferably from 30 percent to 70 percent in the form of the sodium salt.

SUMMARY OF THE INVENTION

It is desirable to have a low molecular weight copolymer having structural groups which enhance compatibility with other polymers, particularly other polymers having a higher molecular weight than the low molecular copolymer. In accordance with the present invention, a low molecular weight copolymer with carboxyl groups is reacted with at least one amino acid compound. This increases the compatibility of the reaction product with polymers such as polyamides.

The preferred low molecular weight copolymer reaction product is derived from a copolymer acid of an α-olefin and an unsaturated carboxylic acid, preferably an α,β-ethylenically unsaturated carboxylic acid. The acid copolymer has a number average molecular weight of from about 500 to about 6,000. Preferably, the low molecular weight copolymer acid is a copolymer of ethylene and acrylic acid or methacrylic acid, having a number average molecular weight of from about 1,000 to about 3,500. The copolymer acid has preferably from about 0.8 to about 35, and preferably from 5 to 25 weight percent of the comonomer acid with a corresponding amount of α-olefin.

Up to 100, preferably from about 10 to 100, and more preferably from about 50 to 100 percent, of the carboxylic acid groups are reacted with at least one amino acid compound. The amino acid compound has an amine end group and a carboxylic acid end group. The amine end group reacts with the carboxyl end group of the copolymer acid to form an amide group at the reaction site. There is from about 0.1 to about 50, preferably about 0.1 to about 40, more preferably about 0.5 to about 30, and most preferably about 5 to 25 weight percent based on the weight of the copolymer reaction product of the amide chain derived from the amino acid compound. The amide chain can be from about 10 to about 30 or about 0.1 to about 10 weight percent of the reaction product group depending on the desired properties.

The average amide chain length reacted at each carboxyl site is preferably from about 1 to about 250, preferably 1 to 200, with specific embodiments including amide chain lengths of from 1 to 10, and 1 to 5 amide groups. There can be longer amide chain lengths of from 100 to 250 amide groups. Preferably, there are sufficient amide grafts, of sufficient length to confer compatibility of the copolymer reaction product and another polymer, preferably polyamide. For the purpose of the present invention amino acid compounds include cyclic amides, i.e., lactams which can be hydrolized to form an amino acid compound. A preferred amino acid compound has the formula $H_2NCH_2(CH_2)_nCOOH$ where n is from 0 to 12, and more preferably from 4 to 8. The most preferred amino acid is amino caproic acid or its lactam, caprolactam.

The present invention includes a method of preparing the above recited copolymer reaction product comprising the steps of heating the copolymer of the α-olefin and the unsaturated carboxylic acid, preferably the α,β-ethylenically unsaturated carboxylic acid, to from about 110° C. to about 300° C., preferably about 150° C. to about 275° C., and more preferably about 200° C. to about 275° C.; adding a sufficient amount of at least one amino acid compound to react with up to 100 percent of the carboxylic acid groups; and conducting reaction of the copolymer and the acid. Preferably, the copolymer acid is preheated to from 110° C. to 200° C. and more preferably, 125° C. to 175° C. The reaction is preferably conducted under an inert atmosphere, such as nitrogen or argon, or under a vacuum.

The present invention also includes a polymer composition and a pigmented composition. The polymer composition comprises at least one first polymer, preferably a polyamide and the above recited reaction product. The pigment composition comprises a pigment, at least one second polymer comprising the above recited copolymer reaction product, and optionally, at least one first polymer. The first polymer and the reaction product being different.

The copolymer reaction product of the present invention is useful in a method of flushing a pigment of the type wherein water in an aqueous mass of pigment is flushed with a low molecular weight polymer. The improvement comprises flushing the aqueous mass of pigment with at least one copolymer reaction product of the present invention resulting in a pigmented composition.

The pigmented composition of the present invention can be used in a wide variety of compositions where the pendant amide chains on the reaction product enhance compatibility. A particularly useful composition is a composition comprising the pigmented composition and a polyamide polymer. Such compositions have excellent uniformity of pigment distribution. More importantly, the pigmented composition results in a polyamide composition with uniform pigment distribution evidenced by uniform and enhanced color. The color is actually enhanced by more complete pigment dispersion.

DETAILED DESCRIPTION OF THE INVENTION

The present invention includes a copolymer reaction product of a low molecular weight copolymer of an unsaturated acid and an α-olefin, and an amino acid compound resulting in a copolymer having pendant amide chains including polyamides, and a method to make the reaction product. The present invention also includes a polymer composition, and a pigmented composition which comprise the copolymer reaction product, as well as compositions which comprise the pigmented composition. The present invention further includes a method of flushing pigments with the copolymer reaction product.

Copolymers useful to make the copolymer reaction product of the present invention include the copolymer of an α-olefin and an unsaturated carboxylic acid, preferably an α,β-ethylenically unsaturated carboxylic acid or derivative thereof. These copolymers are of low molecular weight, having a number average molecular weight of from about 500 to about 6,000, and preferably about 1,000 to about 3,500. Useful and preferred copolymers include homogeneous copolymers of ethylene disclosed in U.S. Pat. No. 3,658,741, the disclosure of which is hereby incorporated by reference.

The α-olefin preferably has from 2 to 8 carbon atoms and is most preferably ethylene or propylene. There is at least about 50, preferably from about 50 to about 99.5, more preferably, about 65 to about 99.2, and most preferably from about 80 to about 98 mol percent of the α-olefin, which is most preferably ethylene.

The unsaturated carboxylic acid or derivatives thereof includes such compounds disclosed in U.S. Pat. No. 3,658,741. Useful carboxylic acids include both monocarboxylic and polycarboxylic acids and derivatives thereof, including esters and anhydrides, which are capable of reacting with the amino acids recited below. Useful carboxylic acids or derivatives thereof include unsaturated monocarboxylic acid containing from 3 to 6 carbon atoms and dicarboxylic acids containing from 4 to 8 carbon atoms. Specific examples of unsaturated acids copolymerizable with ethylene include acrylic acid, methacrylic acid, ethacrylic acid, itaconic acid, crotonic acid, maleic acid and fumaric acid. Also useful are acid halides, amides and esters including acrylyl chloride and acrylamide. Esters which can be used include methyl acrylate, methyl methacrylate, ethyl acrylate and dimethylaminoethyl methacrylate. Also useful are monoesters of dicarboxylic acids, such as methyl hydrogen maleate, methyl hydrogen fumarate, ethyl hydrogen fumarate, and maleic anhydride. Particularly preferred compounds include α,β-ethylenically unsaturated acids and derivatives thereof.

A preferred copolymer acid is a copolymer of ethylene and an α,β-ethylenically unsaturated mono-carboxylic acid having 3 to 6 carbon atoms. A most preferred α,β-ethylenically unsaturated mono-carboxylic acid is acrylic acid. Most preferred is ethylene acrylic acid copolymer which has an acid number in the range from about 1 to about 180, with an acid number from about 40 to 160 being preferred, and an acid number from about 40 to 120 being most preferred. The acid number is determined by the number of milligrams of potassium hydroxide needed to neutralize one gram of acid. The number average molecular weight is from about 500 to about 5000, and preferably from about 1000 to about 3500. Table I below characterizes preferred ethylene acrylic acid copolymers.

TABLE I

| Copolymer Acid | Softening Pt. (ASTM E-28) °C. | Softening Pt. (ASTM E-28) °F. | Hardness dmm (ASTM D-5) | Density g/cc D-1501 | Brookfield Viscosity @ 140° C. cps | Acid No. mg KOH/g | Wt % Acrylic |
|---|---|---|---|---|---|---|---|
| A | 108 | 226 | 2.0 | 0.93 | 500 | 40 | 5 |
| B | 101 | 215 | 4.0 | 0.93 | 650 | 75 | 9.4 |
| C | 92 | 198 | 11.5 | 0.93 | 650 | 120 | 15 |

The copolymer acids are available from AlliedSignal Inc. as A-C®540(A); A-C®580(B) and A-C®143(C).

The low molecular weight copolymer acids can be prepared by any suitable method such as described in above referenced U.S. Pat. No. 3,658,741. Of particular interest in U.S. Pat. No. 3,658,741 is the passage beginning at column 7, line 36 through column 8, line 6. In accordance with this process, the ethylene desirably constitutes at least 65% by weight of the monomer feed and the comonomer from 1.0% to 35% of the feed, preferably 2 to 20% by weight of the feed. Under specific conditions of vapor phase polymerization the ratios by weight of the monomers in the feed and in the product are substantially constant. The ratio of comonomer between feed and product are at most only minor such that products obtained by the invention contain a major portion of ethylene and generally 0.8% to 35% by weight of the comonomer, preferably 2.0% to 20% by weight of the comonomer. The ratio of comonomer in the product to comonomer in the feed is preferably within the range of 0.7:1 to 1.8:1.

The acid copolymers useful in the present invention are of low molecular weight ranging generally between about 500 to about 6000 number average molecular weight, preferably between about 1000 to about 3500 number average molecular weight, as measured by a vapor pressure osmometer. The copolymers also desirably have a Brookfield viscosity not exceeding about 2000 centipoises at 140° C., preferably between about 200 to about 1200 centipoises at 140° C. Of special interest are the copolymers of ethylene and acrylic or methacrylic acid containing from about 1% to about 20% by weight acrylic acid or methacrylic acid in the copolymer, preferably about 3.5% to about 12%, and further characterized by a number average molecular weight between about 1500 to about 3500, acid number between about about 10 to about 200, preferably about 20 to about 130, and hardness (0.1 mm penetration) between 0.5 to 30, preferably 1 to 10 when tested at room temperature about 25° C. (77° F.) according to ASTM D-5 using a needle with a load of 100 grams for 5 seconds.

In accordance with the present invention up to 100, preferably from about 50 to about 100 and more preferably about 10 to about 30 percent of the carboxylic acid groups are reacted with from about 0.1 to about 50, preferably, 0.1 to 40, more preferably about 0.5 to about 30, and most preferably about 5 to about 25 weight percent based on the weight of the reaction product of at least one amide chain derived from at least one amino acid compound. There can be from about 10 to about 30, or about 0.1 to about 10 weight percent of at least one amide derived from at least one amino acid. For the purpose of the present invention amino acid compounds include: amino acids, and cyclic amides, i.e., lactams which can be hydrolized to form amino acids; and derivatives thereof.

Preferably, the amino acid compound is an amino acid monomer which has the formula $H_2NCH_2(CH_2)_nCOOH$ where n is from 0 to 12, and more preferably from 4 to 8; or an amino acid oligomer or polymer derived from this monomer. The most preferred amino acid monomer is amino caproic acid or its lactam, caprolactam.

Also useful amino acid compounds are derivatives of the amino acids including esters, or lactams of the amino acids. Specific examples of useful amino acids include ε-aminocaproic acid; 11-aminoundecanoic acid; 12-aminododecanoic acid; esters, amides and lactams of monoamino-monocarboxylic acids, such as ε-caprolactam; ethyl ε-aminocaproate; lauryl lactam; ethyl-11-aminoundecanoate; 11-aminoundecanoamide, and the like. The amino acid can be a polyamide, such as, polycaprolactam. Alternatively, the polyamide can be a polyamide of the type made from a diamine and a dicaboxylic, such as poly(hexamethylene adipamide), i.e., nylon 66.

The reaction between the amino acid compound and the acid copolymer results in grafts having the formula

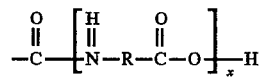

wherein x is from at least 1, and preferably 1 to 250, and R can comprise at least 2 methylene groups and preferably from 4 to 8 methylene groups; or be the radical of a diacid/diamine polyamide.

The average amide chain length reacted at each carboxyl site is preferably from about 1 to about 250, preferably 1 to 200, with specific embodiments including amide chain lengths of from 1 to 10, and 1 to 5 amide groups. There can be longer amide chain lengths of from 100 to 250 amide groups. Preferably, there are sufficient amide grafts, of sufficient length to confer compatibility of the copolymer reaction product and another polymer, preferably polyamide. For the purpose of the present invention amino acid compounds include cyclic amides, i.e., lactams which can be hydrolized to form an amino acid compound. A preferred amino acid compound has the formula $H_2NCH_2(CH_2)_nCOOH$ where n is from 0 to 12, and more preferably from 4 to 8. The most preferred amino acid is amino caproic acid or its lactam, caprolactam.

The copolymer reaction product of the present invention is characterized by an acid number of from about 10 to about 200, preferably about 25 to about 150, and most preferably about 25 to about 75 where the acid number is the number of milligrams of KOH used to neutralize one gram of sample. The copolymer reaction product has a Brookfield viscosity at 140° C. of from about 500 to about 5,000, preferably about 500 to about 2,000, and more preferably about 500 to about 1,500. The Mettler drop point according to ASTM D-3104 can be at least about 90° C., and can be from about 90° C. to about 150° C.

The present invention includes a method for preparing the above recited copolymer reaction product comprising the steps of heating a copolymer of α-olefin and an α,β-ethylenically unsaturated carboxylic acid to from about 110° C. to about 300° C., preferably about 150° C. to about 275° C., and more preferably about 200° C. to about 275° C.; adding a sufficient amount of at least one amino acid compound to react with up to 100 and preferably 50 to 100 percent of the carboxylic acid groups; and conducting the reaction of the copolymer and the amino acid compound. Preferably, the copolymer acid is preheated to from about 110° C. to about 200° C. and more preferably, about 125° C. to about 175° C. prior to reaction with the amino acid compound.

The reaction is preferably conducted under an inert atmosphere, such as nitrogen or argon, or under a vacuum. The reaction pressure is not critical and is preferably conducted at about 1 atmosphere. The reaction can be conducted continuously or in batches.

The present invention also includes a polymer composition comprising at least one first polymer, and at least one second polymer comprising the above recited copolymer reaction product. The polymer composition comprises up to 99 percent and preferably from 1 to 99 percent of at least one first polymer and a corresponding amount of the reaction product. The reaction product can lubricate the first polymer consistent with polymer lubrication recited in U.S. Pat. No. 4,412,040. The first polymer is different from the second polymer.

The first polymers include but are not limited to polyamides, such as nylon 6, nylon 66, nylon 4, nylon 11, nylon 12 and like; polyolefins, such as polyethylene and polypropylene; styrene based polymers, such as polystyrene; polyesters, such as polyethylene terephthalate and polybutylene terephthalate; ABS (copolymers of acrylonitrile, butadiene and styrene); polycarbonates; phenolic resins.

The present invention includes a pigment composition comprising from about 1 to about 50, preferably from about 5 to about 40, and more preferably from about 15 to about 35 weight percent of above-recited copolymer reaction product; from about 1 to about 50, and more preferably from about 5 to about 40 weight percent of a pigment; and from 0 to 98 weight percent of the first polymer. The pigment composition is useful in polymer compositions for molded and extruded goods, films and fibers, inks and the like. The reaction product by virtue of improved compatibility with the first polymer improves pigment dispersion consistent with improved dispersion properties recited in U.S. Pat. No. 4,603,172.

Typical pigments include: titanium dioxide, zinc oxide; calcium carbonate; barite, silica and china clay; lead white; carbon black; red lead; chromate pigments; Venetian Red; Prussian blue; chromic oxide; chrome green; cobalt blue, Phthalo blue, Phthalo green, and azo pigments.

There can be from about 0.1 to about 100 parts per hundred parts of polymer of the pigment to be dispersed. Preferably there is about 0.1 to about 50 parts of the material. Lower concentrations of from about 0.1 to about 1 part per hundred parts of polymer are useful for direct blending of low concentration materials such as colorants. Higher concentrations of from greater than about 10 parts of material can be directly introduced into the polymer. High concentrations of from about 10 to about 50 parts of material per hundred parts of polymer are useful to make masterbatches, such as color concentrates, for introduction into larger quantities of the same or different polymers.

The composition can comprise conventional additives such as colorants including fillers, flame retardants, antioxidants, stabilizers, processing aids, and the like.

Typically, fillers may be selected form a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, wollastonite, etc. The foregoing recited fillers are illustrative only and are not meant to limit the scope of the fillers that can be utilized in this invention.

The copolymer reaction product of the present invention is useful in a method of flushing a pigment, of the type wherein water in an aqueous mass of pigment is flushed away with a low molecular weight polymer. The improvement of this invention comprises flushing the aqueous mass of pigment with at least one copolymer reaction product of the present invention.

In the flushing process an aqueous pigment mass comprising finely divided pigment is in the form of a filter press cake having from about 25 to about 60, and more typically from about 30 to about 45 weight percent of pigment with a corresponding amount of water. The low molecular weight copolymer reaction product is added in a mixing means such as a Sigma blade mixer in amounts as recited above. Preferably, there is (based on the weight of pigment) from about 25 to 75, and more preferably from about 40 to about 60 percent by weight of the aqueous pigment mass and a corresponding amount of the low molecular weight copolymer reaction product. The mixture is heated until the water separates from the pigment and the low molecular weight reaction product, typically at about 90° C. to about 110° C., preferably, about 90° C. to about 100° C., and most preferably, about 90° C. to about 95° C. The process typically takes from 10 to 120 minutes and more usually 15 to 30 minutes. At this point a drop in power to the mixer will be observed. The mixing is continued for a few more minutes, typically 2 to 5 additional minutes. The water in the mixer is decanted. A vacuum can be applied to remove the balance of the water. This leaves behind a uniform blend of the pigment and the low molecular weight copolymer reaction product. The process of flushing can be conducted batchwise or continuously with filter press cake and copolymer reaction product continuously or intermittently added as the water is decanted. The process has resulted in a high quality dispersion of the pigment in the copolymer reaction product.

The flushed pigments result in pigment concentrates which can be further diluted with a first polymer of the type recited above to make pigment master batches. Such dilution can be accomplished by melt blending in a suitable melt blender, such as an extruder. The pigment master batch typically has from 40 to 80 weight percent of a first polymer and correspondingly from 20 to 60 weight percent of the pigment concentrate.

The flushed pigments in the form of pigment concentrates and in pigment master batches are useful in polymeric compositions used for fibers, molding compounds, extrusion compounds, sheets, film, and the like.

The examples set forth below illustrate the nature of the invention and the manner of carrying it out. However, the invention should not be considered as being limited to the details thereof.

EXAMPLE 1

This example illustrates the copolymer reaction product of the present invention based on an ethylene acrylic acid copolymer B of Table 1, sold by Allied-Signal Inc. as A-C®580. This copolymer acid is reported to have an acid number of 71.9. 4361 grams of A-C®580 were melted in a twelve liter flask. A nitrogen atmosphere was maintained at all times. The copolymer was heated to 116° C., at which time 713 gms of 6-aminocaproic acid powder was added. The mixture was continually stirred. The temperature was increased and at 149° C. the evolution of water was observed. The water was allowed to distill. At 156° C. water was evolving vigorously. The temperature was then maintained at 160°–162° C. for three hours. After three hours at 160° C., the flask was discharged, at which point the material had an acid number of 65.1. Acid number is based on the milligrams of KOH needed to neutralize a gram of sample.

EXAMPLE 2

Pilot plant runs were made to make the copolymer reaction product of the present invention. The copolymer acid used was A-C®580 described above. The amino acid used was a polycaprolactam having a number average molecular weight of about 18,000, and a formic acid viscosity of about 50. Where indicated the polycaprolactam contained minor amounts of heat stabilizers. The polycaprolactam was a straight chain polymer terminated at one end with an amine group and at the opposite end with a caboxylic acid group.

A charge of 550 pounds (250 kg) copolymer acid was first premelted in a 200 gallon (0.76m³) tank at 145 to 150° C. under a nitrogen sweep at about 1 atm.

The molten copolymer acid was fed to a 200 gallon (0.76m₃), stirred reactor which had a condenser to remove moisture flashing off during the formation of the reaction product. The copolymer acid was heated to about 158° to 162° C. and 155 pounds (70 kg) of the polycaprolactam was gradually added. The reactor was closed and heating continued to 260° C. for eight hours with agitation.

Seven batches were made using the stabilized polycaprolactam (Runs 1–7) and two batches were made using the same polycaprolactam without stabilizers (Runs 8,9). Results are reported in Table 2 below.

TABLE 2

| RUN | PARTS PER 100 AC580 | Rx TEMP (°C.) | ACID NO. (°C.) | METTLER DROP POINT (°C.) | BROOKFIELD VISC. @ 140° C. (Cps) |
|---|---|---|---|---|---|
| 1 | 28.2 | 250 | 54.4 | 96.2 | 1575 |
| 2 | 28.2 | 270 | 54.5 | 97.0 | 1730 |
| 3 | 28.2 | 260 | 54.3 | 96.8 | 1520 |
| 4 | 22.6 | 250 | 57.1 | 96.6 | 1488 |
| 5 | 17.0 | 250 | 60.5 | 96.1 | 1375 |
| 6 | 28.2 | 250 | 54.9 | 95.3 | 1562 |
| 7 | 28.2 | 260 | 54.5 | 95.6 | 1542 |
| 8 | 28.2 | 260 | 54.9 | 96.1 | 1777 |
| 9 | 28.2 | 260 | 55.3 | 96.2 | 1825 |

EXAMPLE 3

The procedure of Example 2 was repeated resulting in a reaction product having an acid number of 51.1; a Brookfield viscosity at 140° C. of 1168 centipoise; and a Mettier Drop Point of 100.7° C.

The copolymer reaction product had a uniform and white appearance. The feel was that of a hard waxy material. As indicated by the relatively low Mettler Drop Point values, this material is readily melt blendable with other polymers.

While exemplary embodiments of the invention have been described, the true scope of the invention is to be determined from the following claims.

What is claimed is:

1. In a method of flushing a pigment, of the type wherein water in an aqueous mass of pigment is flushed with a low molecular weight polymer, the improvement comprising flushing the aqueous mass of pigment with at least one copolymer reaction product of a copolymer acid of an α-olefin and an α,β-ethylenically unsaturated carboxylic acid, the copolymer acid having a number average molecular weight of from about 500 to about 6,000 reacted with from about 0.1 to about 30 weight percent of at least one amino acid compound based on the weight of said reaction product.

2. The method of claim 1 wherein the amino acid compound is derived from an amino acid monomer of the formula $H_2NCH_2(CH_2)_nCOOH$ where n is from 0 to 12.

3. The method of claim 2 where n is from 4 to 8.

4. The method of claim 3 where the amino acid monomer is aminocaproic acid.

5. The method of claim 1 where the α-olefin is selected from ethylene and propylene.

6. The method of claim 5 where the α-olefin is ethylene.

7. The method of claim 1 where the carboxylic acid is an α,β-ethylenically unsaturated carboxylic acid.

8. The method of claim 7 where the α, β-ethylenically unsaturated carboxylic acid is selected from acrylic acid, methacrylic acid, crotonic acid, maleic acid and fumaric acid, and mixtures thereof.

9. The method of claim 7 where the α,β-ethylenically unsaturated carboxylic acid is acrylic acid.

10. The method of claim 1 where there is from about 10 to about 30 weight percent of the amino acid compound.

11. The method of claim 1 where there is from about 0.1 to about 10 weight percent of the amino acid compound.

12. The method of claim 1 wherein the copolymer comprises about 65 to about 98 mol percent of the α-olefin and about 2 to about 35 mol percent of the α,β-ethylenically unsaturated carboxylic acid.

13. The method of claim 12 wherein from about 50 to about 100 mol percent of the carboxylic acid groups are reacted with the amino acid compound.

14. The method of claim 1 where the amino acid compound has an average chain length at each carboxyl site of from about 1 to about 250 amino acid monomer units.

15. The method of claim 1 where the amino acid is a polyamide.

* * * * *